US011913875B2

(12) United States Patent
Reimann et al.

(10) Patent No.: US 11,913,875 B2
(45) Date of Patent: Feb. 27, 2024

(54) METHOD FOR THE IDENTIFICATION OF AN INCORRECTLY CALIBRATED OR NON-CALIBRATED INFRARED SPECTROMETER

(71) Applicant: Evonik Operations GmbH, Essen (DE)

(72) Inventors: Ingolf Reimann, Reinheim (DE); Joachim Reising, Kleinostheim (DE); Christoph Mueller, Offenbach am Main (DE)

(73) Assignee: Evonik Operations GmbH, Essen (DE)

( * ) Notice: Subject to any disclaimer, the term of this patent is extended or adjusted under 35 U.S.C. 154(b) by 449 days.

(21) Appl. No.: 17/311,911

(22) PCT Filed: Dec. 13, 2019

(86) PCT No.: PCT/EP2019/085010
§ 371 (c)(1),
(2) Date: Jun. 8, 2021

(87) PCT Pub. No.: WO2020/126869
PCT Pub. Date: Jun. 25, 2020

(65) Prior Publication Data

US 2022/0026350 A1 Jan. 27, 2022

(30) Foreign Application Priority Data

Dec. 17, 2018 (EP) .................................... 18212853

(51) Int. Cl.
*G01N 21/27* (2006.01)
*G01J 3/28* (2006.01)

(52) U.S. Cl.
CPC ............. *G01N 21/274* (2013.01); *G01J 3/28* (2013.01); *G01J 2003/2859* (2013.01); *G01J 2003/2879* (2013.01)

(58) Field of Classification Search
CPC .. G01N 21/274; G01J 3/28; G01J 2003/2859; G01J 2003/2879; G01J 2003/2866
See application file for complete search history.

(56) References Cited

U.S. PATENT DOCUMENTS

| | | | |
|---|---|---|---|
| 5,933,792 | A | 8/1999 | Andersen et al. |
| 2008/0290279 | A1 | 11/2008 | Juhl |
| 2008/0297796 | A1 | 12/2008 | Lukas et al. |
| 2015/0335248 | A1 | 11/2015 | Huang et al. |
| 2017/0153142 | A1 | 6/2017 | Rosen et al. |

FOREIGN PATENT DOCUMENTS

| | | | |
|---|---|---|---|
| CN | 103649726 | | 3/2014 |
| EP | 0 808 450 | B1 | 5/2000 |
| EP | 1 998 155 | A1 | 12/2008 |
| WO | WO 2006/066581 | A1 | 6/2006 |
| WO | WO 2012/122151 | | 9/2012 |
| WO | WO 2014/007759 | A1 | 1/2014 |
| WO | WO 2018/031954 | | 2/2018 |

OTHER PUBLICATIONS

Hanne Winning et al., "Standardization of FT-IR instruments", XP055673619, Mar. 1, 2014, pp. 1-7. (Year: 2014).*
International Search Report and Written Opinion dated Mar. 13, 2020 in PCT/EP2019/085010 filed on Dec. 13, 2019.
Winning, "Standardization of FT-IR instruments", 2014, Issue 1, XP055673619, Retrieved from the Internet: URL:www.fossanalytics.com [retrieved on Mar. 4, 2020], pp. 1-7.

* cited by examiner

*Primary Examiner* — David P Porta
*Assistant Examiner* — Casey Bryant
(74) *Attorney, Agent, or Firm* — Oblon, McClelland, Maier & Neustadt, L.L.P.

(57) ABSTRACT

The present invention relates to a computer-implemented method for identifying an incorrectly or non-calibrated infrared spectrometer, comprising the steps of a) recording an infrared spectrum of a sample with a first infrared spectrometer to provide a sample infrared spectrum, b) recording an infrared spectrum of the same sample as in step a) with a second infrared spectrometer to provide a reference infrared spectrum, wherein said second spectrometer is a correctly calibrated infrared spectrometer, or b') providing a reference spectrum of the same sample as in step a), wherein said reference spectrum was recorded on a second infrared spectrometer, which is a correctly calibrated spectrometer, c) determining a difference between the wavelength of each extreme point in the sample of step a) and the wavelength of each extreme point in the reference spectrum of step b) or b'), and d) indicating the infrared spectrometer of step a) as incorrectly calibrated or non-calibrated, when at least one difference was determined in step c).

14 Claims, No Drawings

METHOD FOR THE IDENTIFICATION OF AN INCORRECTLY CALIBRATED OR NON-CALIBRATED INFRARED SPECTROMETER

The present invention relates to a method for identifying an incorrectly calibrated or non-calibrated infrared spectrometer and a method for the correction of a spectrum recorded on an incorrectly calibrated or non-calibrated infrared spectrometer.

Preciseness in the recording of an infrared spectrum is a key point for a meaningful analysis of the recorded infrared spectrum. The accuracy of measurements strongly depends on the calibration of the respective measurement device and the used calibration method. In particular, it is a big issue when the calibration of the wavelength scale of the spectrometer is not correct. For example, the method for calibrating a near infrared spectrometer can be different from the adequate calibration method or there are other influences, which affect the near infrared device and its preciseness. As a consequence, the peaks of a specific signal or all signals in the recorded spectra will not be at the correct wavelength positions and therefore, any further calculations based on the recorded spectra will be incorrect. Problems with the calibration of the wavelength scale can be present right from the beginning, when the infrared spectrometer was incorrectly calibrated or even not at all by the supplier or manufacturer. One reason for the wrong calibration can be the absence of a constant working temperature of the infrared spectrometer during the calibration procedure. In that case, the individual parts of the spectrometer have each a different temperature, and thus, any attempts to calibrate said spectrometer will lead to an incorrect adjustment of its wavelength scale. Consequently, any later routine checks fora shift of the wavelength scale of said infrared spectrometer based on an internal comparison of the current wavelength scale with the originally adjusted, i.e. incorrectly calibrated, wavelength scale will lead to a incorrectly positive result. This will give the user a false sense of security. Independently thereof, problems with the calibration of the wavelength scale will automatically arise over the type and duration of the operation of the infrared spectrometer. One might think that the calibration of an infrared spectrometer could be easily done by use of a reference sample, whose infrared spectrum is well known. However, this approach does not consider changes of said sample over time, in particular ageing of the compound, which again leads to differences in the recorded infrared spectrum. Unwanted wavelength shifts in infrared spectra are in particular a problem for so-called standalone spectrometers, i.e. spectrometers, which are not part of any kind of network, which would allow for online corrections.

The published patent application WO 2006/066581 A1 discloses a method for standardizing an infrared spectrometer based on spectral patterns of constituents of atmospheric air naturally occurring in the spectrometer. In detail, this method includes the steps of providing an optical spectrum recorded by the spectrometer and comprising spectral patterns originating from constituents of atmospheric air in the spectrometer, selecting a spectral pattern originating from constituents of atmospheric air in the spectrometer, determining a wavelength dependent position value associated with the selected spectral pattern, and adjusting a wavelength scale of the optical spectrum based on a difference between the determined value and a corresponding reference value of the selected spectral pattern. The method particularly focuses on the use of $CO_2$ for standardizing an infrared spectrometer, in particular adjusting the wavelength scale of an optical spectrum recorded by a spectrometer. As visible from FIG. 3 in WO 2006/066581 A1, atmospheric air contains a multitude of different components and each of these components has absorption bands that overlap at least partly and sometimes completely with the absorption bands of other components. In particular, the dominant absorption bands of water vapor are a big problem because they are very broad and also cover the absorption bands of the other constituents of atmospheric air, in particular of methane, nitrous oxide ($N_2O$), oxygen, ozone, and carbon dioxide. However, although most of the absorption of e.g. carbon dioxide are covered by the dominant absorption bands of water vapor, the focus of WO 2006/066581 A1 is nevertheless on selecting spectral pattern of carbon dioxide in a spectrum for determining an absorption shift. The identification and selection of the spectral pattern of carbon dioxide, which is not covered by the dominant absorption bands of water vapor, is therefore a complicated human job, which requires a good training and years of experience. Therefore, only trained specialists can practice the method of WO 2006/066581 A1 which significantly reduces the circle of users for this method. The problem of overlapping absorption bands also results in a poor practical suitability of the method of WO 2006/066581 A1. For example, WO 2006/066581 A1 teaches that the spectrometer should be dried up to remove water vapor and thus get rid of the dominating absorption bands of water vapor. However, this option only works for a laboratory spectrometer but with a hand-held spectrometer, which is specifically used outside of any laboratory conditions. Specifically, it is not possible when working with a hand-held infrared spectrometer to record any spectra free from any water vapor.

The published patent application US 2008/297796 A1 also discloses a method for wavelength calibration of a spectrometer. Specifically, this method involves cutting out a measured-value block from a calibration spectrum which corresponds to one of the measured-value blocks present on the spectrometer of the model spectrum. The step of cutting out a measured-value block from a calibration spectrum which corresponds to one of the measured-value blocks present on the spectrometer of the model spectrum, requires the knowledge of the calibration and of the model spectrum, which is not the case in practice, in particular when untrained people shall use the method. Therefore, the method of US 2008/297796 A1 requires a well training staff with years of experience. Therefore, only trained specialists can practice this method which significantly reduces the circle of users of this method.

Accordingly, there was a need for a less complicated method for identifying an incorrectly calibrated or non-calibrated infrared spectrometer and a need for a method for the correction of an infrared spectrum, which was recorded on incorrectly calibrated or non-calibrated infrared spectrometer.

It was found that an infrared spectrometer can be identified as incorrectly calibrated or non-calibrated, e.g. having a shifted wavelength scale, by determining differences between the wavelength of each extreme point in a sample infrared spectrum recorded on a first infrared spectrometer, which is to be identified as incorrectly calibrated or non-calibrated, and the wavelength of the same extreme point(s) in a reference spectrum recorded on a second, calibrated infrared spectrometer. When at least one wavelength difference was identified in the spectrum recorded on the first infrared spectrometer, said spectrometer is indicated as incorrectly calibrated non-calibrated. The extreme points, i.e. the highest and lowest absorption or reflectance values, in spectra are particularly suitable for determining wavelength differences between the spectra.

One object of the present invention is therefore a computer-implemented method for identifying an incorrectly calibrated or non-calibrated infrared spectrometer, comprising the steps of a) recording an infrared spectrum of a sample with a first infrared spectrometer to provide a sample infrared spectrum, b) recording an infrared spectrum of the same sample as in step a) with a second infrared spectrometer to provide a reference infrared spectrum, wherein said second spectrometer is a correctly calibrated infrared spectrometer, or b') providing a reference spectrum of the same sample as in step a), wherein said reference spectrum was recorded on a second infrared spectrometer, which is a correctly calibrated spectrometer, c) determining a difference between the wavelength of each extreme point in the sample spectrum of step a) and the wavelength of the same extreme point(s) in the reference spectrum of step b) or b'), and d) indicating the infrared spectrometer of step a) as incorrectly calibrated or non-calibrated, when at least one difference was determined in step c).

The method according to the present invention therefore allows for an automatic identification of an incorrectly calibrated or non-calibrated infrared spectrometer, where the user does not need any practical knowledge of infrared spectroscopy, of interpretation of infrared spectra, of the recorded spectra or of the substance being subjected to the infrared measurements. Specifically, the method according to the present invention does not involve the selection of any specific spectral pattern from recorded spectra, as in the methods of WO 2006/066581 A1 and US 2008/297796 A1. Rather, the method according to the present invention considers the spectrum coming from a potentially incorrectly calibrated or uncalibrated spectrometer as a whole and the reference spectrum also as a whole. Further, in contrast to the method of WO 2006/066581 A1 the method according to the present invention does not require that an involved spectrometer is dried up or remove water vapor.

In the context of the present invention the term incorrectly calibrated or incorrectly calibrated infrared spectrometer is used to denote any type of infrared spectrometer that has a wavelength scale which is shifted compared to the wavelength scale of a (correctly) calibrated infrared spectrometer. Therefore, one or more peaks do not appear at the correct positions in a spectrum recorded on the incorrectly calibrated infrared spectrometer. In other words, these peaks are wavelength shifted compared to the respective peaks in a spectrum of the same substance recorded on a calibrated infrared spectrometer. The term incorrectly calibrated or incorrectly calibrated infrared spectrometer explicitly comprises an infrared spectrometer, that was calibrated but not correctly. Additionally or alternatively, the wavelength scale of said spectrometer may have been affected by any influences such as the absence of a constant working temperature of the infrared spectrometer during the calibration procedure, which resulted in a shifted wavelength scale.

In the context of the present invention the term non-calibrated or non-calibrated infrared spectrometer is used to denote any type of infrared spectrometer that has not been calibrated at all or whose calibration is so wrong, that it cannot be considered calibrated. This means that a non-calibrated infrared spectrometer has a wavelength scale which is shifted compared to the wavelength scale of a (correctly) calibrated infrared spectrometer. Therefore, one or more peaks do not appear at the correct positions in a spectrum recorded on the non-calibrated infrared spectrometer. In other words, these peaks are wavelength shifted compared to the respective peaks in a spectrum of the same substance recorded on a calibrated infrared spectrometer.

By comparison, the term calibrated or calibrated infrared spectrometer is used to denote any type of infrared spectrometer of which it is not known whether it has been calibrated or not and which has a wavelength scale, which is not shifted compared to the wavelength scale of an infrared spectrometer, which is known to be calibrated. Therefore, the peaks in a spectrum of a specific sample, e.g. compound or substance, recorded on an infrared spectrometer of which it is not known whether it has been calibrated or not, are at the same positions, i.e. wavelengths, as in a spectrum of the same sample, e.g. compound or substance recorded on an infrared spectrometer, which is known to be calibrated.

In the context of the present invention the term wavelength shift is used to denote a difference between the specific value for the wavelength of an extreme point in the sample infrared spectrum and the specific value for the wavelength of the same extreme point in the reference infrared spectrum.

In the context of the present invention the term sample is used to denote any type of sample comprising or consisting of a compound or substance which gives an absorption signal in infrared spectroscopy. Preferably, the sample comprises or consists of an organic compound, e.g. said sample is a solution of an organic compound, or it is a solid sample in ground or unground form. Alternatively, it is preferred that the sample is a substance, e.g. a feedstuff and/or feedstuff raw material. Where the sample is a solution of an organic compound, the solvent is chosen under the proviso that it is inert and does not react with the organic compound, which is to be dissolved, and that its absorption signals in the infrared spectrum are different from the characteristic absorption signals of the compound in the sample. It is further preferred to use a solid sample, such as a substance, e.g. feedstuff and/or feedstuff raw material, which has the advantage that the identification of the absorption signals is not affected by any additional absorption signals of a solvent. According to the present invention the same sample is used in steps a), b) or b'), which means that a sample comprising the same compound is used. When the sample is a solution of an organic compound, it is preferred that the sample used in steps a), b) or b') also has the same concentration and contains the same solvent.

In the context of the present invention the term extreme point or also called extremum is used to denote a point in an infrared spectrum, which represents any type of maximum or minimum. Hence, considering that an infrared spectrum can be represented by the graph of a mathematical function, an extreme point in the context of the present invention can be a high or a low point of said function, either within a given range or on the entire domain of said function. When the extreme point is the highest or the lowest point of a function within a given range, e.g., within a range of wavelengths, it is also referred to as relative or local maximum or minimum. On the other hand, an extreme point is referred to as global or absolute maximum or minimum when it is the highest or the lowest point of a function on the entire domain of a function.

According to the present invention the first infrared spectrometer is to be identified as incorrectly calibrated or non-calibrated. Hence, it is not known from said first infrared spectrometer whether it is incorrectly calibrated or non-calibrated.

When the sample spectrum is identical with the reference spectrum, not only the number and the order of appearance of the absorption signals, i.e. of the extreme points, are identical in the sample and in the reference spectrum. Rather, the position of said extreme points in the spectra, i.e. the wavelengths of said extreme points, are identical as well. In detail, the identification of the wavelengths shifts in step c) of the method for identifying an incorrectly calibrated or non-calibrated infrared spectrometer therefore comprises the identification of each extreme point in the sample spectrum and in the reference spectrum, and the assignment of the wavelengths determined for each extreme point in the order of appearance in the sample spectrum to the wavelengths of each extreme point in the order of appearance in the reference spectrum. This assignment gives pairs of matched wavelengths. When the matched wavelengths are identical, their division should give a value of 1. However, in case of different signals the matched wavelengths will differ and their division will give a value different from 1. The step c) of the method for identifying a non-calibrated infrared spectrometer therefore also comprises the step of calculating index ratios for each pair of matched wavelengths by dividing the wavelengths of each pair, wherein a ratio different from 1 indicates a wavelength shift, i.e. a difference between the wavelengths of each pair of matched wavelengths.

In an embodiment of the method for identifying an incorrectly or non-calibrated infrared spectrometer the step c) therefore comprises the steps of

- c1) determining the wavelengths of each extreme point in the sample spectrum of step a), and in the reference spectrum of step b) or b'),
- c2) assigning the wavelengths determined in step c1) in the order of their appearance in the sample spectrum of step a) to the wavelengths determined in step c1) in the order of their appearance in the reference spectrum of step b) or b') to provide pairs of matched wavelengths, and
- c3) calculating index ratios for each pair of matched wavelengths by dividing the wavelengths of said pair, wherein a ratio different from 1 indicates a difference between the wavelengths of each pair.

In principle, the method according to the present invention is not limited regarding the wavelength range of the infrared spectrum to be recorded or the infrared spectrometer, on which said spectrum is recorded. Therefore, the infrared spectrum of step a), b) or b') can be recorded with any suitable or commercially available near infrared spectrometer. However, the most relevant information of an infrared spectrum is usually found in the range of from 1,100 to 2,500 nm. It is therefore preferred to record the spectrum in steps a) or b) in the range of from 1,100 to 2,500 nm. Accordingly, the reference spectrum provided is step b') of the method according to the present invention only needs to cover the range of from 1,100 to 2,500 nm. When the sample of a feedstuff raw material and/or feedstuff in step a), b) or b') is not translucent, the reflectance of the emitted light from the sample is measured and the difference between the emitted light and the reflected light is given as absorption. The thus obtained absorptions, i.e. their intensities and their wavelengths are given in the spectra recorded in steps a) and b) or provided in step b'). Accordingly, a near infrared spectrometer suitable for use in the method according to the present invention can work either in the transmittance mode or in the reflectance mode.

In an embodiment of the method for identifying an incorrectly calibrated or non-calibrated infrared spectrometer the sample and/or the reference spectrum are recorded over a range of from 1,100 to 2,500 nm.

In principle, the method for identifying an incorrectly calibrated or non-calibrated infrared spectrometer according to the present invention is not limited regarding the choice of the particular sample used in step a), b) or b'), provided that said sample or the compound contained in that sample gives clear and assignable absorption signals in infrared spectrometry. Since precision is the key for performing reliable and meaningful analysis by means of infrared spectrometry, it is advantageous that the steps a), b), or b') of the method according to the present invention use the same sample, in particular containing the same compound or substance, whose infrared spectrum is also to be recorded after completion of the method. Said sample preferably comprises an organic compound, e.g. it is a solution of an organic compound. Alternatively, said sample is a solid sample comprising or consisting of the organic compound.

In another embodiment the sample in steps a), b) or b') of the method for identifying an incorrectly calibrated or non-calibrated infrared spectrometer therefore comprises or consists of the same compound or substance, whose infrared spectrum is also to be recorded after completion of the method.

The method according to the present invention involves the identification of wavelengths of extreme points in the spectra and the assigning of wavelengths of extreme points in the sample spectrum to wavelengths of extreme points in the reference spectrum. A functional group in the compound of the sample of steps a), b) or b') gives at least one characteristic and thus clear and assignable absorption signal in an infrared spectrum. Preferably, the compound in the sample of steps a), b) or b') therefore, comprises at least one functional group.

As far as the number of functional groups in the compound of the sample of steps a), b) or b') is concerned, the method for identifying an incorrectly or non-calibrated infrared spectrometer according to the present invention is not subject to any limitation. Notwithstanding, it is believed to be a general trend that the more functional groups are present in the compound of the sample of steps a), b) or b'), the more precise is the method according to the present invention. It is further believed that the presence of at least two different functional groups in a compound of the sample of steps a), b) or b') further improves the preciseness of the method according to the present invention.

In a further embodiment of the method for identifying an incorrectly or non-calibrated infrared spectrometer the sample of steps a), b) or b') comprises or consists of a compound with at least two different functional groups.

Preferably, the at least two different functional groups of said compound are selected from the group consisting of amino group; carboxylic acid group; hydroxyl group; ether group, preferably alkyl ether group, optionally substituted with aryl group, or aryl ether group, optionally substituted with alkyl group; ester group, preferably alkyl ester group, optionally substituted with aryl group, or aryl ester group, optionally substituted with alkyl group; keto group; aldehyde group; guanidine group; amide group; carbamoyl group; thiol group; thiol ether group, preferably alkyl thiol ether group, optionally substituted with aryl group, or aryl thiol ether group, optionally substituted with alkyl group;

disulfide group; benzyl group; phenyl group; benzoyl group; hydroxyphenyl group, preferably 4-hydroxyphenyl group; heteroaryl group, preferably imidazole or indole group; secondary amine group, preferably pyrrolidine group; and/or tertiary amine group. These functional groups give very specific and thus easily identifiable signals in a spectrum. Some of them are typically contained in amino acids, salts of amino acids and derivatives thereof. A typical amino acid salt is an alkaline, alkaline earth or ammonium salt of an amino acid. In the context of the present invention a derivative of an amino acid or amino acid salt is an amino acid or salt thereof in which a specific functional group is transferred into a different group, e.g. a carboxylic acid group is transferred into an ester group, or replaced with another functional group, e.g. an amino group is replaced with a hydroxyl group. For example, in 2-hydroxy-(4-methylthio)-butanoic acid, which is also known as methionine hydroxy analogue (MHA), the amino group of methionine is replaced with a hydroxy group. Samples comprising or consisting of amino acids are for example feedstuffs and/or feedstuff raw materials. Hence, the method according to the present invention is particularly suitable for use in agriculture. This application is also the field where stand-alone infrared spectrometers are quite often used, which are rather susceptible to wavelength shifts.

In a further embodiment of the method for identifying an incorrectly calibrated or non-calibrated infrared spectrometer the sample of steps a), b) or b') comprises or consists of a compound comprising an amino group, a hydroxyl group and/or a carboxylic acid group. Preferably, said compound comprises i) an amino group and a carboxylic acid group, ii) a hydroxyl group and a carboxylic acid group, iii) an amino group and a hydroxyl group, or iv) an amino group, a hydroxyl group and a carboxylic acid group.

It is therefore also preferred that the compound in the sample of steps a), b) or b') is an amino acid, an amino acid salt and/or a derivative thereof.

In principle, the method according to the present invention is not limited regarding the choice of a specific amino acid, amino acid salt and/or derivative thereof. However, it was found that methionine, a methionine salt, such as calcium methionate, and/or a derivative thereof, such as the 2-hydroxy-(4-methylthio)-butanoic acid (MHA) mentioned above, is a particular suitable compound for recording sample and reference spectra in the method according to the present invention. One of the reasons for that is the stability of methionine, its salts and/or derivatives thereof, compared to other amino acids such as cysteine, whose sulfhydryl groups are easily oxidized to give the disulfide cystine. Another reason is that methionine is also often analyzed by means of infrared spectrometry. In particular, in the field of animal nutrition samples of methionine containing feed stuff raw materials or mixed feed stuffs are regularly subjected to infrared spectrometry. In that case, the absorption signals of methionine, methionine salt and/or derivative thereof in the spectrum of feed stuff raw materials or mixed feed stuffs should be identical to the absorption signals in a spectrum of a sample comprising or consisting of pure methionine, methionine salt and/or derivative thereof. The use of methionine, methionine salt and/or derivative thereof for identifying an incorrectly calibrated or non-calibrated infrared spectrometer therefore provides the method according to the present invention with an advantageous degree of preciseness. Preferably, the sample of steps a), b) or b') therefore comprises of consists of methionine, a methionine salt and/or a derivative thereof.

Cases may arise, where it is not easy to identify an extreme point in a spectrum. However, an infrared spectrum can be also expressed as a graph of a mathematical function, in which the absorption signals correspond to extreme points, in particular local or global maxima. Depending on the individual infrared spectrum, it may take two or more mathematical functions to describe the infrared spectrum. Irrespective of that, it is possible to facilitate the identification of the presence of an extreme point, either a local or a global maximum, in a mathematical function and its position therein by taking the first and/or second derivative of the one or more functions. Transferred to the infrared spectrum of steps a), b) or b'), that means that first, the one or more functions describing the infrared spectrum had to be obtained, something which can be done by use of mathematical analysis programs, and subsequently, the first and/or second derivative had to be taken. Taking the first derivative of a spectrum facilitates the identification of the extreme points in the spectrum because it gives a zero crossing of absorption maxima or minima. Taking the second derivative gives a minimum at exactly that position, where an absorption maximum was in the original spectrum and a maximum at the position of an absorption minimum in the original spectrum.

In yet another embodiment the step c1) of the method for identifying an incorrectly calibrated or non-calibrated infrared spectrometer further comprises the step of taking the first and/or second derivative of the sample spectrum and of the reference spectrum.

Once the position of an extreme point in the sample spectrum, i.e. the wavelength of an extreme point in the sample spectrum, has been determined, it is possible to assign said wavelength of the sample spectrum to the corresponding wavelength of the reference spectrum. When the sample spectrum is identical with the reference spectrum, both spectra have extreme points, in particular absorption maxima, at the same positions, i.e. at the same wavelengths. As a consequence of this, both spectra should have the same number of extreme points and said extreme points should also appear in the same order in the spectra and at the same position, i.e. wavelengths, in said spectra.

Therefore, in a preferred embodiment of the method for identifying an incorrectly calibrated or non-calibrated infrared spectrum in step c3) a wavelength of an extreme point in the sample spectrum or in a derivative thereof is assigned to a wavelength of an extreme point in the reference spectrum or in a derivative thereof when the extreme point in the sample spectrum or in a derivative thereof is in the same order of appearance as the corresponding extreme point in the reference spectrum or in a derivative thereof.

The information on the wavelengths, such as their values and the value of the index ratios of matched wavelengths, are useful data about the first infrared spectrometer used in step a) of the method according to the present invention. Specifically, the index ratios obtained in step c4) of an embodiment of the method according to the present invention and the two wavelengths forming said ratio, are suitable to make corrections of a non-calibrated infrared spectrometer, as explained below in more detail. Preferably, these data are therefore stored in a database, data storage or cloud together with the identification or serial number of the infrared spectrometer of step a) of the method according to the present invention.

In another preferred embodiment the method for identifying an incorrectly calibrated or non-calibrated infrared spectrum therefore further comprises the steps of c4) generating arrays of ratios for each of the index ratios of step c3) and the two wavelengths forming said ratio, and c5) storing the arrays of ratios of step c4) in a database, data storage or cloud together with the identification or serial number of the infrared spectrometer of step a).

In its broadest sense the present invention also relates to the use of an infrared measuring cell comprising an amino acid, salt of an amino acid and/or a derivative thereof, preferably methionine, a methionine salt and/or derivative thereof for identifying an incorrectly calibrated or non-calibrated infrared spectrometer.

Once an infrared spectrometer has been identified as incorrectly calibrated or non-calibrated because of a wavelength shift, there is also a need for correcting the spectrum recorded on that incorrectly calibrated or non-calibrated infrared spectrometer.

It was found that this object is solved by use of the arrays of ratios for each of the index ratios of step c3) of the method for identifying an incorrectly calibrated or non-calibrated infrared spectrometer. Said index ratios allow to correct the wavelength shifts in the infrared spectrum recorded on the incorrectly calibrated or non-calibrated infrared spectrometer. In detail, the infrared spectrometer, on which an infrared spectrum of a sample was recorded, is identified by its identification or serial number, and the arrays of ratios obtained for this particular infrared spectrometer in step c5) of the method for identifying an incorrectly calibrated or non-calibrated infrared spectrometer according to the present are loaded from a database, data storage or cloud. Next, the index ratios of each array of ratios are multiplied with the corresponding wavelength of an extreme point in the aforementioned spectrum recorded on the infrared spectrometer to provide corrected wavelengths of said extreme points.

In another embodiment the computer-implemented method according to the present invention further comprises the steps of i) recording an infrared spectrum of a sample on an incorrectly calibrated or non-calibrated infrared spectrometer to provide an infrared spectrum of said sample, wherein said sample is identical or different from the sample of step a) of the method for identifying an incorrectly calibrated or non-calibrated infrared spectrometer according to the present invention, ii) identifying the infrared spectrometer of step i) by its identification or serial number, iii) loading the arrays of ratios obtained for the infrared spectrometer of step i) in step c5) of the method for identifying an incorrectly calibrated or non-calibrated infrared spectrometer according to the present invention from a database, data storage or cloud, iv) multiplying the index ratio of each array of ratios of step iii) with the corresponding wavelength of an extreme point in the spectrum of step i) to provide corrected wavelengths of the extreme points, and v) providing a corrected infrared spectrum with the corrected wavelengths of extreme points of step iv).

According to the present invention the infrared spectrum of step i) is recorded on an incorrectly calibrated or non-calibrated infrared spectrometer. This means that the infrared spectrum of step i) has a shifted wavelength scale, i.e. at least one extreme point in said spectrum is not at the expected position, where it should be, i.e. it has a wavelength shift.

Preferably, the infrared spectrometer of step i) is the first infrared spectrometer of step a) of the method for identifying an incorrectly or non-calibrated infrared spectrometer, which has been identified as incorrectly calibrated or non-calibrated. It is therefore preferred that the said infrared spectrometer of step i) has already been identified as incorrectly calibrated or non-calibrated in the method for identifying an incorrectly or non-calibrated infrared spectrometer according to the present invention. It is therefore also preferred that the method for the correction of an infrared spectrum according to the present invention comprises all steps, preferably steps a) to d), in particular also steps c1 to c5), and all embodiments of the method of identifying an incorrectly calibrated or non-calibrated infrared spectrometer according to the present invention. In that case, the steps and embodiments of the method of identifying an incorrectly calibrated or non-calibrated infrared spectrometer precede the steps and embodiments of the method for the correction of an infrared spectrum according to the present invention.

The method involving steps i) to v) is not limited regarding the sample, i.e. the compound or substance, whose infrared spectrum is recorded in step i). Therefore, said sample can be a known or unknown sample, e.g. it can be identical with or different from the sample of step a). Nevertheless, it is preferred that the sample of step i) comprises or consists of the same compound or substance as the sample of step a). In order to allow for the most possible preciseness, it is further preferred that the sample of step i) is the same sample as in step a) of the method for identifying an incorrectly calibrated or non-calibrated infrared spectrometer.

The procedure of the steps i) to iv) above gives the corrected wavelengths in the spectrum recorded on an incorrectly calibrated or non-calibrated infrared spectrometer. However, the spectrum with the corrected wavelengths is no longer consistent with the original infrared spectrum recorded on the infrared spectrometer. In order to facilitate the determination of extreme points in the spectrum for later applications, it is therefore preferred to correct the spectrum as a whole. The corrected wavelengths of the extreme points and their absorption intensities form the basis for the correction of the spectrum as a whole: the position of the extreme points in the spectrum is moved from the shifted wavelengths to the corrected wavelengths. In the next step, it is necessary to draw a graph through the extreme points of the corrected wavelengths and where appropriate, through the other points of the spectrum, whose positions are not affected by the wavelength shifts. This can be done by interpolation. However, in context of the present invention it has been proven to be advantageous not to draw one single polynomial through all extreme points in the spectrum; rather it is preferred to use several polynomials to connect adjacent points, which smoothly combine to one graph. The spline interpolation or better cubic spline interpolation is very useful for interpolating data to new wavelength values and also for generating continua. Thus, the (cubic) spline interpolation is preferred for interpolating between all wavelengths of extreme points in order to provide a corrected infrared spectrum. It is a further advantage of spline interpolation that it only requires relatively easy calculations. The spline interpolation can be visualized as a flexible strip that is bent to pass through each of the extreme points in the spectrum to be interpolated. This strip can be described by a series of cubic polynomials, hence it is called cubic spline interpolation, which must meet the requirement that the spline must go through all function values, the first and second derivatives of the cubic polynomials are continuous, and the curvature is forced to zero at the endpoints of the interval in the spectrum. Once the corrected wavelengths of the extreme points are known, the cubic polynomials can be easily calculated by means of any mathematical program.

In one embodiment step iv) the method according to the present invention therefore further comprises the steps of iv1) calculating polynomials for the wavelengths of two adjacent extreme points in the spectrum of step i), wherein said wavelengths are corrected wavelengths obtained in step iv) and/or wavelengths for which no wavelength shift was determined in step c) of the method for identifying an incorrectly calibrated or non-calibrated infrared spectrum, and iv2) interpolating between all wavelengths in the spectrum of step i) with the polynomials of step iv1) to provide a corrected infrared spectrum.

Based on the thus provided corrected infrared spectrum, it is now possible to read off all relevant information, in particular the wavelengths of all extreme points, i.e. absorption maxima and absorption minima, from said corrected infrared spectrum. Among this, it is particularly relevant to read off the absorption maxima at the wavelengths, both corrected and non-corrected, in the corrected infrared spectrum provided in step iv2) of the embodiment mentioned above, because the absorption maxima are the most important information in an infrared spectrum.

In a preferred embodiment the method according to the present invention further comprises the step of vi) reading off the absorption maxima at the wavelengths in the corrected infrared spectrum of step v).

The thus obtained corrected wavelengths can also be used to follow trends in the deviations of the wavelengths recorded for a standard, i.e. a specific sample in the method for identifying an incorrectly calibrated or non-calibrated infrared spectrometer, on an incorrectly calibrated or non-calibrated infrared spectrometer from the wavelengths recorded for the same standard on a calibrated infrared spectrometer. Therefore, it is preferred to store a corrected infrared spectrum of step v) together with the identification or serial number of the infrared spectrometer of step i). Further, the corrected wavelengths obtained in the method according to the present invention also allow to calibrate the infrared spectrometer of step i), when it was identified as uncalibrated or not correctly calibrated in the method of the present invention, i.e. in step d) of said method, using the corrected wavelengths obtained in step iv).

In a further preferred embodiment the method according to the present invention therefore further comprises the step of vii) storing the corrected infrared spectrum of step v) together with the identification or serial number of the infrared spectrometer of step i).

In another preferred embodiment the method according to the present invention further the step of viii) calibrating the infrared spectrometer of step i) to the corrected wavelengths obtained in step iv).

It is also preferred to perform the method for identifying an incorrectly calibrated or non-calibrated infrared spectrometer in periodical intervals, preferably weekly or daily. This allows to provide for the best possible precision of an infrared spectrometer, i.e. infrared spectrometer of step a) and/or the infrared spectrometer of step i). It is further preferred that the both methods are performed in the same periodical intervals, preferably weekly or daily.

In a further embodiment, the steps a) to d) of the method for identifying an incorrectly calibrated or non-calibrated infrared spectrometer and the steps i) to v) are performed in the same periodical intervals.

The methods according to the present invention can be performed in close proximity to or away from the infrared spectrometer, which is to be identified as incorrectly calibrated or non-calibrated, and on which the infrared spectrum to be corrected was recorded. In the latter case, the method for correction is considered as a remote correction.

It is further beneficial to provide for a system, which allows an easy communication between the (first) incorrectly calibrated or non-calibrated infrared spectrometer, a second, calibrated infrared spectrometer and/or a database on which the reference spectrum recorded on said second, calibrated infrared spectrometer, is stored, and a computer, which performs amongst others the determination of wavelength shifts, the correction of the shifted wavelengths and the correction of the infrared spectrometer recorded on the incorrectly calibrated or non-calibrated infrared spectrometer.

Another object of the present invention is therefore a system suitable for carrying out the method for identifying an incorrectly calibrated or non-calibrated infrared spectrometer according to the present invention and/or the method for the correction of an infrared spectrum according to the present invention, wherein the system is a network comprising the first infrared spectrometer and a control unit at least adapted to determine a difference between the wavelength of each extreme point in the sample spectrum of step a) and the wavelength of each extreme point in the reference spectrum of step b) and/or b'), and to calculate the index ratios of step c3) for each pair of matched wavelengths of step a) and/or to calculate the polynomials of step iv1) for the wavelengths of two adjacent extreme points in the spectrum of step i) and to interpolate between all wavelengths in the spectrum of step i) with the polynomials to provide a corrected infrared spectrum.

Said device can be a network comprising the first and second infrared spectrometer and a computer. Alternatively, said device can be a network comprising the first, non-calibrated infrared spectrometer, a cloud on which the reference spectrum recorded on the second, calibrated infrared spectrometer is stored, and a computer.

The present invention is further illustrated in the following items:

1. A computer-implemented method for identifying an incorrectly calibrated or non-calibrated infrared spectrometer, comprising the steps of
   a) recording an infrared spectrum of a sample with a first infrared spectrometer to provide a sample infrared spectrum,
   b) recording an infrared spectrum of the same sample as in step a) with a second infrared spectrometer to provide a reference infrared spectrum, wherein said second spectrometer is a correctly calibrated infrared spectrometer,
   or
   b') providing a reference spectrum of the same sample as in step a), wherein said reference spectrum was recorded on a second infrared spectrometer, which is a correctly calibrated spectrometer,
   c) determining a difference between the wavelength of each extreme point in the sample spectrum of step a) and the wavelength of the same extreme point in the reference spectrum of step b) or b'), and
   d) indicating the infrared spectrometer of step a) as incorrectly calibrated or non-calibrated, when at least one difference was determined in step c).

2. The computer-implemented method according to item 1, wherein the step c) further comprising the steps of
   c1) determining the wavelengths of each extreme point in the sample spectrum of step a), and in the reference spectrum of step b) or b'),
   c2) assigning the wavelengths determined in step c1) in the order of their appearance in the sample spectrum of step a) to the wavelengths determined in step c1) in the order of their appearance in the reference spectrum of step b) or b') to provide pairs of matched wavelengths, and
   c3) calculating index ratios for each pair of matched wavelengths by dividing the wavelengths of said pair, wherein a ratio different from 1 indicates a difference between the wavelengths of each pair.
3. The computer-implemented method according to any of items 1 to 2, wherein the sample in steps a), b) or b') comprises or consists of the same compound or substance, whose infrared spectrum is also to be recorded after completion of the method.
4. The computer-implemented method according to any of items 1 to 3, wherein the sample of steps a), b) or b') comprises or consist of a compound with at least two different functional groups.
5. The computer-implemented method according to any of items 1 to 4, wherein the sample of steps a), b) or b') comprises or consists of a compound comprising an amino group, a hydroxyl group and/or a carboxylic acid group.
6. The computer-implemented method according to any of items 1 to 5, further comprising the step of taking the first and/or second derivative of the sample spectrum and of the reference spectrum.
7. The computer-implemented method according to any of items 2 to 6, wherein in step c3) a wavelength of an extreme point in the sample spectrum or in a derivative thereof is assigned to a wavelength of an extreme point in the reference spectrum or in a derivative thereof when the extreme point in the sample spectrum or in a derivative thereof is in the same order of appearance as the corresponding extreme point in the reference spectrum or in a derivative thereof.
8. The computer-implemented method according to any of items 2 to 7, further comprising the steps of
   c4) generating arrays of ratios for each of the index ratios of step c3) and the two wavelengths forming said ratio, and
   c5) storing the arrays of ratios of step c4) in a database, data storage or cloud together with the identification or serial number of the infrared spectrometer of step a).
9. A computer-implemented method for the correction of an infrared spectrum comprising the steps of
   i) recording an infrared spectrum of a sample on an incorrectly calibrated or non-calibrated infrared spectrometer to provide an infrared spectrum of said sample, wherein said sample is identical or different from the sample of step a) according to item 1,
   ii) identifying the infrared spectrometer of step i) by its identification or serial number,
   iii) loading the arrays of ratios obtained for the infrared spectrometer of step i) in step c5) of the method according to item 8 from a database, data storage or cloud,
   iv) multiplying the index ratio of each array of ratios of step iii) with the corresponding wavelength of an extreme point in the spectrum of step i) to provide corrected wavelengths of the extreme points, and
   v) providing a corrected infrared spectrum with the corrected wavelengths of the extreme points of the step iv).
10. The computer-implemented according to any of items 1 to 8, further comprising the steps of
   i) recording an infrared spectrum of a sample on an incorrectly calibrated or non-calibrated infrared spectrometer to provide an infrared spectrum of said sample, wherein said sample is identical or different from the sample of step a) according to claim 1,
   ii) identifying the infrared spectrometer of step i) by its identification or serial number,
   iii) loading the arrays of ratios obtained for the infrared spectrometer of step i) in step c5) of the method according to claim 8 from a database, data storage or cloud,
   iv) multiplying the index ratio of each array of ratios of step iii) with the corresponding wavelength of an extreme point in the spectrum of step i) to provide corrected wavelengths of the extreme points, and
   v) providing a corrected infrared spectrum with the corrected wavelengths of the extreme points of the step iv).
11. The computer-implemented method according to item 9 or 10, wherein the step iv) further comprises the steps of
   iv1) calculating polynomials for the wavelengths of two adjacent extreme points in the spectrum of step i), wherein said wavelengths are corrected wavelengths obtained in step iv) and/or wavelengths for which no wavelength shift was determined in step c) of the method according to claim 1, and
   iv2) interpolating between all wavelengths in the spectrum of step i) with the polynomials of step iv1) to provide a corrected infrared spectrum.
12. The computer-implemented method according to any of items 9 to 11, further comprising the step of
   vi) reading off the absorption maxima at the wavelengths in the corrected infrared spectrum of step v).
13. The computer-implemented method according to any of items 9 to 12, further comprising the step of
   vii) storing the corrected infrared spectrum of step v) together with the identification or serial number of the infrared spectrometer of step i)
14. The computer-implemented method according to any of items 9 to 13, further comprising the step of
   viii) calibrating the infrared spectrometer of step i) to the corrected wavelengths obtained in step iv).
15. The computer-implemented method according to any of items 1 to 14, wherein the method for identifying an incorrectly calibrated or non-calibrated infrared spectrometer according to any of items 1 to 14 and the method for the correction of an infrared spectrum according to any of items 9 to 14 are performed in the same periodical intervals.
14. A system suitable for carrying out the method for identifying an incorrectly calibrated or non-calibrated infrared spectrometer according to any of items 1 to 14 and the method for the correction of an infrared spectrum according to any of items 9 to 14, wherein the system is a network comprising a first infrared spectrometer and a control unit at least adapted
   to determine a difference between the wavelength of each extreme point in the sample spectrum of step a) and the wavelength of each extreme point in the reference spectrum of step b) or b'), and to calculate the index ratios of step c3) for each pair of matched wavelengths of step a) and/or to calculate the polynomials of step iv1) for the wavelengths of two adjacent extreme points in the spectrum of step i) and to interpolate between all wavelengths in the spectrum of step i) with the polynomials to provide a corrected infrared spectrum.

15. Use of an infrared measuring cell comprising an amino acid, salt of an amino acid and/or a derivative thereof, in a method for identifying an incorrectly calibrated or non-calibrated infrared spectrometer according to any of items 1 to 14 or in the computer-implemented method for the correction of an infrared spectrum according to any of items 9 to 14.

The invention claimed is:

1. A computer-implemented method for identifying an incorrectly calibrated or non-calibrated infrared spectrometer, the computer-implemented method comprising:

a) recording an infrared spectrum of a sample with a first infrared spectrometer to provide a sample infrared spectrum, b) recording an infrared spectrum of the same sample as in a) with a second infrared spectrometer to provide a reference infrared spectrum, wherein said second spectrometer is a correctly calibrated infrared spectrometer, or b') providing a reference spectrum of the same sample as in a), wherein said reference spectrum was recorded on a second infrared spectrometer, which is a correctly calibrated spectrometer, c) determining a difference between the wavelength of each extreme point in the sample spectrum of a) and the wavelength of the same extreme point(s) in the reference spectrum of b) or b'), comprising:

c1) determining the wavelengths of each extreme point in the sample spectrum of a), and in the reference spectrum of b) or b'), wherein c1) further comprises taking the first and/or second derivative of the sample spectrum and of the reference spectrum, c2) assigning the wavelengths determined in c1) in the order of their appearance in the sample spectrum of a) to the wavelengths determined in c1) in the order of their appearance in the reference spectrum of b) or b') to provide pairs of matched wavelengths, and c3) calculating index ratios for each pair of matched wavelengths by dividing the wavelengths of said pair, wherein a ratio different from 1 indicates a difference between the wavelengths of each pair, c4) generating arrays of ratios for each of the index ratios of c3) and the two wavelengths forming said ratio, and c5) storing the arrays of ratios of c4) in a database, data storage or cloud together with the identification or serial number of the infrared spectrometer of a), d) indicating the infrared spectrometer of a) as incorrectly calibrated or non-calibrated, when at least one difference was determined in c), e) recording an infrared spectrum of a sample on an incorrectly calibrated or non-calibrated infrared spectrometer to provide an infrared spectrum of said sample, wherein said sample is identical or different from the sample of a), f) identifying the infrared spectrometer of e) by its identification or serial number, g) loading the arrays of ratios obtained for the infrared spectrometer of e) in c5) from a database, data storage or cloud, h) multiplying the index ratio of each array of ratios of iii) with the corresponding wavelength of an extreme point in the spectrum of e) to provide corrected wavelengths of the extreme points, and i) providing a corrected infrared spectrum with the corrected wavelengths of the extreme points of h).

2. The computer-implemented method according to claim 1, wherein the sample in a), b) or b') or a compound contained in that sample gives clear and assignable absorptions signals in infrared spectrometry.

3. The computer-implemented method according to claim 1, wherein the sample in a), b) or b') comprises or consists of the same compound or substance, whose infrared spectrum is also to be recorded after completion of the method.

4. The computer-implemented method according to claim 1, wherein the sample of a), b) or b') comprises or consist of a compound with at least two different functional groups.

5. The computer-implemented method according to claim 1, wherein the sample of a), b) or b') comprises or consists of a compound comprising an amino group, a hydroxyl group and/or a carboxylic acid group.

6. The computer-implemented method according to claim 1, wherein the compound in the sample of a), b) or b') is an amino acid, an amino acid salt and/or a derivative thereof.

7. The computer-implemented method according to claim 1, wherein in c3) a wavelength of an extreme point in the sample spectrum or in a derivative thereof is assigned to a wavelength of an extreme point in the reference spectrum or in a derivative thereof when the extreme point in the sample spectrum or in a derivative thereof is in the same order of appearance as the corresponding extreme point in the reference spectrum or in a derivative thereof.

8. The computer-implemented method according to claim 1, wherein h) further comprises h1) calculating polynomials for the wavelengths of two adjacent extreme points in the spectrum of e), wherein said wavelengths are corrected wavelengths obtained in h) and/or wavelengths for which no wavelength shift was determined in step c), and h2) interpolating between all wavelengths in the spectrum of e) with the polynomials of h1) to provide a corrected infrared spectrum.

9. The computer-implemented method according to claim 8, further comprising:

j) reading off the absorption maxima at the wavelengths in the corrected infrared spectrum of i).

10. The computer-implemented method according to claim 1, further comprising:

k) storing the corrected infrared spectrum of j) together with the identification or serial number of the infrared spectrometer of e).

11. The computer-implemented method according to claim 1, further comprising:

l) calibrating the infrared spectrometer of e) to the corrected wavelengths obtained in h).

12. A system suitable for carrying out the method for identifying an incorrectly calibrated or non-calibrated infrared spectrometer according to claim 1, wherein the system is a network comprising a first infrared spectrometer and a control unit at least adapted to determine a difference between the wavelength of each extreme point in the sample spectrum of a) and the wavelength of each extreme point in the reference spectrum of b) or b'), and to calculate the index ratios of c3) for each pair of matched wavelengths of a).

13. The system according to claim 12, wherein the control unit is adapted to calculate the polynomials of h1) for the wavelengths of two adjacent extreme points in the spectrum of e) and to interpolate between all wavelengths in the spectrum of e) with the polynomials to provide a corrected infrared spectrum.

14. The computer-implemented method according to claim 1, wherein the sample comprises or consists of an infrared measuring cell comprising an amino acid, salt of an amino acid and/or a derivative thereof.

* * * * *